United States Patent [19]
Mizobuchi

[11] Patent Number: 5,919,838
[45] Date of Patent: *Jul. 6, 1999

[54] METHOD FOR PREPARING INK CONCENTRATES

[76] Inventor: Yoshikazu Mizobuchi, 9700 Dee Rd. #318, Des Plaines, Ill. 60016

[21] Appl. No.: 08/586,099

[22] Filed: Jan. 16, 1996

Related U.S. Application Data

[60] Provisional application No. 60/006,743, Nov. 2, 1995.
[51] Int. Cl.⁶ ..................................................... C09D 11/10
[52] U.S. Cl. ........................ 523/161; 524/313; 106/27 R; 106/28 R; 260/DIG. 38
[58] Field of Search ..................... 523/161; 260/DIG. 38; 106/27 R, 28 R; 524/313

[56] References Cited

U.S. PATENT DOCUMENTS 4,327,011   4/1982   Ripley et al. ............................ 524/474
4,755,563   7/1988   West ........................................ 525/287

*Primary Examiner*—Marion McCamish
*Assistant Examiner*—John J. Guarriello
*Attorney, Agent, or Firm*—Leydig, Voit & Mayer

[57] ABSTRACT

Methods for preparing an ink concentrate are disclosed. To prepare the ink concentrate, a varnish that includes at least one dispersing polymer is added to the pigment particles, such as an aqueous slurry or an organic-solvent-treated aqueous slurry of the pigment particles. The blend of varnish and pigment particles then is heated to a temperature effective to melt the dispersing polymer. Upon cooling, the dispersing polymer solidifies at the surface of the pigment particles to thereby physically attach and bond to and preferably encapsulate the pigment particles and form an ink concentrate. The ink concentrate thus formed will have improved color properties as compared to conventional ink concentrates.

52 Claims, No Drawings

METHOD FOR PREPARING INK CONCENTRATES

The present application claims priority from U.S. Ser. No. 60/006,743, a provisional patent application filed Nov. 2, 1995.

TECHNICAL FIELD OF THE INVENTION

The present invention, in one aspect, is directed to the field of inks. More specifically, the invention is directed towards the preparation of inks, and the preparation of ink concentrates useful in preparing inks. In particular, the invention focuses on the purification and modification of pigment particles for use in ink concentrates and for ultimate use in pigmented inks.

BACKGROUND OF THE INVENTION

Pigmented inks are used in a variety of industrial and consumer applications. The ink industry has long sought to improve upon the color strength, image gloss, and color density of such pigmented inks, while minimizing the amount of pigment used in each batch of ink. To improve upon these properties, the prior art has provided a number of methods of treating the pigment particles to provide surface-modified pigment particles and to provide pigments with a fine particle size.

Color strength may be determined qualitatively, or may be quantitatively defined according to the CIELAB system of the Commission Internationale de l'Éclairage. In this system, values of L*, a*, and b* are assigned to the color of the ink. L* represents the lightness of the ink with small values down to zero indicating "darkness" and large value up to 100 indicating "brightness." a* represents red or green, with more positive values indicating "redness" and more negative values indicating "greenness." b* represents yellow or blue, with more positive values indicating "yellowness" and more negative values indicating "blueness." See generally Kirk-Othmer Encyclopedia of Chemical Technology 6:523–548 (1979). Gloss may be defined as the percentage of light reflected at the same angle as the angle of incidence. The typically used total angle is 60°. See Kirk-Othmer Encyclopedia of Chemical Technology 16:745 (1981) (describing gloss in the context of paint). Color density is a strength of color which is categorized by black and white, blue (or cyan), red (or magenta) or yellow. A densitometer may be used to measure the strength of darkness, blueness, redness and yellowness in a given ink sample. The color strength, gloss, and density of a pigmented ink may be generally referred to as the color properties of the ink.

The prior art has taught to provide pigment particles having a wetted pigment surface in order to enhance the color properties. See, e.g., B. G. Hays, *American Ink Maker* (November 1990), which summarizes some of the prior art surface wetting techniques. See also Walter Kurtz, *American Ink Maker* (June 1987). For instance, acrylic materials are used to wet the surface of the pigment particles in dry form using certain solvents. Use of these materials often results in agglomeration of the pigment particles, and does not reduce particle size of pre-agglomerated pigments. Such agglomeration and large pigment size detract from the color strength and gloss of the pigmented inks.

The prior art further has taught the use of certain ionic materials to modify the surfaces of the pigment particles. For instance, U.S. Pat. No. 4,755,563 discloses block polymers containing ionic moieties such as carboxyl terminated with alkyl or alkyl ether of one to twenty carbon atoms. In addition, the use of ionomers is disclosed in WO93/23795. Such ionic species have been found to be too hydrophilic to be effective in wetting the surface of the pigment particles, inasmuch as the pigment particles will tend to absorb fountain solutions used in printing. This will cause a significant change in the rheological properties of the ink, such as viscosity, yield value, shortness factor, tackiness, and ink transfer efficiency. The ionic materials thus are unsatisfactory in preparing pigmented inks.

The pigments used to prepare inks typically are provided in the form of aqueous slurries. Inks used in commercial processes typically are organic in nature, however, and thus the water present in the slurry must be removed during the process of preparing the ink. To formulate a pigmented, organic ink from the slurry of pigment particles, the slurry is filtered and washed to form a presscake comprising from 20% to 40% by weight pigment particles. This presscake then is further processed to prepare an ink.

The prior art has provided a number of alternative methods for processing the wet presscake of pigment particles to prepare an organic ink. The first method, which may be referred to as the dry powder method, entails drying the presscake at an elevated temperature for several hours to drive off the water. This causes the pigment particles to agglomerate to form a dried presscake comprising a solid mass of pigment. After the presscake has been dried, it then must be milled to render particulate pigment suitable for use in an ink.

A second method, which may be referred to as the flushed paste method, avoids drying the pigment presscake. This method entails mixing the wet presscake with an organic varnish to thereby increase the hydrophobicity of the surfaces of the pigment particles. See generally, Albert Mercado, "Flushes for Paste Inks," *American Ink Maker* (June–August 1990). The varnishes disclosed by Mercado include a vehicle and a supporting resin, such as pentaerythrinol ester of rosin. Water separates from the organic varnish phase, and is decanted to leave an ink concentrate. The water remaining in the ink concentrate then is eliminated under reduced pressure with heat. This method has a number of advantages over the dry powder method, in that it avoids the time-consuming and expensive steps of drying the presscake and milling the agglomerated pigment particles to the desired size.

Each of the foregoing methods suffers from a number of disadvantages, however. For example, each method requires the step of filtering the slurry to form a presscake. This step is very time consuming, inasmuch as slurries typically contain from 2%–3% pigment particles by weight. In addition, particle size cannot readily be controlled. The dry powder method does not control pigment particle size at all, and requires milling to render particulate pigment. Nor can particle size readily be controlled in the flushed paste method. Although no milling process is required by this method, the size of the pigment particles in the varnish is typically from about 0.2 μm to about 0.5 μm. This is larger than desired, inasmuch as the ideal particle size for pigmented inks is in the range of about 0.04 μm to about 0.2 μm. Pigment slurries also typically contain high salt concentrations, which might remain in the dried ink concentrate, if the washing process is not complete.

Other methods for enhancing the color strength and gloss of pigmented inks have focused on minimizing the pigment particle size, and preventing agglomeration of the pigment particles. It is well known that color properties are enhanced as particle size decreases. See, e.g., Kurtz, "Aspects of Pigment Processing," *American Ink Maker* (June 1987). Attempts to enhance color properties by controlling uniformity of pigment particle size also have been made. See, e.g., Albert Mercado, "Flushes for Paste Inks", *American Ink Maker* (June–August 1990).

Such efforts to improve upon the color properties of pigmented inks as have been described have provided pigmented inks that have acceptable, but not superior, color strength, gloss, and density. Accordingly, a need exists in the art for a method for preparing ink concentrates that have superior color strength, gloss, and density as compared to known pigmented inks. A further need exists for a method for preparing ink concentrates from aqueous slurries of pigment particles, or from dry pigment particles, wherein pigment particle size is controlled. It is a general object of the present invention to provide methods for preparing ink concentrates that will render inks having superior color properties and that satisfy the foregoing needs.

SUMMARY OF THE INVENTION

In accordance with the invention, an ink concentrate is prepared by blending the pigment particles with a varnish including at least one dispersing polymer. The blend is heated to melt the dispersing polymer, which, upon cooling, solidifies on the surfaces of the pigment particles, and wets the particles to prevent the particles from agglomerating. Inks then may be prepared from the ink concentrates thus provided. The pigment particles may be in dry form, such as a dry powder prepared by grinding a dried presscake, or may be in wet form, such as an aqueous slurry.

For example, an ink concentrate may be prepared directly from an aqueous slurry of pigment particles. In accordance with this aspect of the invention, a varnish is added to the aqueous slurry. Bulk water then is removed from the slurry, leaving a blend of water, pigment particles, and varnish. This blend is stirred under a vacuum to remove water, then is heated to a temperature effective to melt the dispersing polymer. Upon cooling, the dispersing polymer solidifies at the surface of the pigment particles. Preferably, the dispersing polymer is present in sufficient quantity to encapsulate the pigment particles, although the particles need not be encapsulated for the present invention to be operative. When formulated into an ink, the ink concentrate thus prepared will have superior color strength and gloss as compared to conventional inks prepared from commercially available flushes.

Thus, the present inventive method for preparing an ink concentrate may comprise the steps of:
  (a) providing an aqueous slurry of pigment particles;
  (b) adding a varnish to the aqueous slurry, the varnish including at least one dispersing polymer, to thereby form a mixture of varnish and slurry;
  (c) removing water from the mixture to leave a blend of varnish and pigment;
  (d) heating the blend to a temperature effective to melt the dispersing polymer and to drive off any remaining water in the blend; and
  (e) cooling the blend to thereby form an ink concentrate.
Preferably, the mixture of varnish and slurry is vigorously stirred and heated to a temperature effective to enhance the binding of the dispersing polymer to the pigment particles prior to heating to a temperature sufficient to melt the dispersing polymer.

Most preferably, the pigment particles are treated with a volatile organic solvent prior to adding the varnish to thereby separate salts and other undesirable water-soluble impurities from the liquid slurry. The prior art has taught to remove these impurities by providing large amounts of wash water. In accordance with the prior art, the pigment particle slurry is diluted and filtered, thereby removing the impurities. In contrast, when the pigment particles are treated with a volatile organic solvent in accordance with the present invention, wash water may be conserved, and the filtration step may be eliminated. The preferred method of the present invention thus comprises the steps of:
  (i) providing an aqueous slurry of pigment particles;
  (ii) treating the slurry with an organic solvent, preferably a volatile organic solvent, to thereby form an aqueous impurity-rich phase and an organic pigment-rich phase;
  (iii) separating the organic pigment-rich phase;
  (iv) optionally adding water to the organic pigment-rich phase and repeating step (iii).
Preferably, the method comprises the additional steps of:
  (v) adding a varnish to the separated organic pigment-rich phase, the varnish including at least one dispersing polymer, to thereby form a blend of varnish, organic solvent, and pigment;
  (vi) heating the blend to a temperature effective to melt the dispersing polymer and to drive off volatile components of the mixture; and
  (vii) cooling the blend to thereby form an ink concentrate.
The separated organic pigment-rich phase may include water, which preferably is driven off in step (vi).

When the method of the present invention is applied to dry pigment particles, the varnish is added directly to the pigment particles to thereby form a blend of varnish and pigment particles. The blend is then heated to a temperature effective to melt the dispersing polymer, then cooled. The invention thus comprises the steps of:
  (1) providing dry pigment particles;
  (2) providing a varnish, the varnish including at least one dispersing polymer;
  (3) blending the varnish and the pigment particles to thereby form a blend of varnish and pigment particles;
  (3) heating the blend to a temperature effective to melt the dispersing polymer; and
  (4) cooling the blend to thereby form an ink concentrate.
The heating of the blend preferably is accomplished as the pigment particles are added to the varnish. For example, the varnish may be heated to a temperature effective to melt the dispersing polymer, and the pigment particles then may be added to the varnish.

The present invention also encompasses ink concentrates prepared by the methods of the present invention. Further, the invention encompasses methods for preparing an ink and the inks prepared thereby.

DESCRIPTION OF THE PREFERRED EMBODIMENTS

PIGMENT PARTICLES

Pigments may be defined generally as coloring materials that form a heterogeneous mixture with the carrying vehicle at normal process conditions, as opposed to dyes, which form a homogeneous phase with the carrying vehicle. Any pigment suitable for use as a colorant in a pigmented ink may be used in conjunction with the present invention. For example, carbon black (such as Elftex 8, Cabot Corp.), titanium dioxide, phthalocyanines such as copper pthalocyanine blue, azo pigments, quinacridones, anthraquinones, dioxazines, indigos, thioindigos, perynones, perylenes, indolenones, azomethines, triphenyl methanes, and the like may be used. The color of the ink primarily will be a function of the pigment or pigments used in the ink. Dry pigments that are not available in presscake form may be reconstituted with water.

Many pigments are commercially available as wet press cakes, which may be re-dispersed in solution to form an aqueous slurry if desired. For example, if a presscake is provided commercially, it may be re-dispersed to provide an aqueous slurry of pigment particles. Examples of commercially available pigments include Copper Phthalocyanine Blue G/S presscake (BL2101-PC) (37.1% by weight pigment content); Lithol Rubine presscake (LR5133-PC) (21.6% by weight pigment content); and Diarylid Yellow AAA T/P presscake (YA1933-PC) (18.0% by weight pigment content), all available from Magruder Color Co., Inc., Elizabeth, N.Y. Some manufacturers also will provide aqueous slurries of pigment particles. Other commercially available pigments and press cakes include those of the following pigments:

Metallized Azo Reds: Red 49:1 (Barium salt), Red 49:2 (Calcium salt), Red 63:1 (Calcium salt)

Toluidine reds

Naphthol reds

Pyrazolones

Rhodamines

Quiacridones: Red B, Red Y, Magenta B, Magenta and violet

Phthalocyanine blues

Phthalocyanine greens

Carbazole violets

Monoarylid Yellow

Diarylid Yellow

Chrome yellow

Red Lake c

Lithol reds: calcium and barium salts

Bon Maroon

Perylene pigments

Red 2B: Calcium, Barium and Magnesium salts

Alkali Blue

Chrome Orange

Molybdate orange

Orange 36, Diarylide orange, Dianisidine orange, tolyl orange and Dinitraniline orange Such pigments may have a wide range of particle sizes, as from about 0.04 $\mu$m to about 100 $\mu$m, preferably from about 0.04 $\mu$m to about 1 $\mu$m, and more preferably from about 0.04 $\mu$m to about 0.5 $\mu$m. Most preferably, the pigment particle size is from about 0.04 $\mu$m to about 0.2 $\mu$m when used in an ink. If desired, the pigment particles can be milled, although this is not necessary to the practices of the invention.

When provided in the form of a presscake slurry, many pigments will include undesirable water-soluble impurities. These impurities comprise unreacted starting materials or other ingredients generated in the pigment preparation and grinding processes. See, e.g., Mercado, "Flushes For Paste Inks," *American Ink Maker* (June–August 1990) (describing processes for manufacturing pigments). For example, such impurities may include ethylene glycol, unreacted starting materials, and salts. Many of these impurities adversely ultimately will adversely affect the color quality of the ink prepared with the pigments, or will interfere with the printing process, if the impurities are allowed to remain in the slurries. Accordingly, it is preferred to remove these impurities before mixing the slurry with a varnish. The impurities may be removed by dilution and filtration, or, as is preferred, may be removed by treating the slurry with an organic solvent, as hereinafter described.

VARNISHES

Any varnish that is compatible with the pigment particles and that includes a dispersing polymer may be employed in conjunction with the present invention. In accordance with the preferred embodiments of the present invention, the varnish includes a hydrophobic carrier, a supporting resin, a wetting polymer, and a dispersing polymer, as set forth below. The varnish also may include other ingredients, such as rheological-property modifying agents, including softeners, plasticizers, and the like; diluents, including light oils; antioxidants; and so forth. It is only necessary, however, that the varnish include a dispersing polymer that will modify the surface of the pigment particles with heat so as to render the particles hydrophobic, and it should be understood that the present invention is operative in the absence of the optional ingredients.

When the method of the present invention is applied to an aqueous slurry of pigment particles, the varnish must have a hydrophobic character, and must reduce polarity of the pigment particles. In a preferred embodiment of the present invention, the varnish for adding to an aqueous slurry includes a hydrophobic carrier in an amount ranging from about 50% to about 90% by weight, a supporting resin in an amount ranging from about 8% to about 35% by weight, a wetting polymer in an amount ranging from 0% to about 16% by weight, and a dispersing polymer in an amount ranging from about 1% to about 15% by weight. The wetting polymer need not be included; when a wetting polymer is included, it should be used in an amount ranging from abut 0.1% to about 16% by weight. Most preferably, the varnish includes a hydrophobic carrier in an amount ranging from about 60% to about 85% by weight, a supporting resin in an amount ranging from about 10% to about 25% by weight, a wetting polymer in an amount ranging from about 2% to about 10% by weight, and a dispersing polymer in an amount ranging from about 3% to about 8% by weight.

When the varnish is mixed directly with dry pigment particles, the varnish similarly should have a hydrophobic carrier, and should reduce polarity of the pigment particles. The varnish should include a hydrophobic carrier in an amount ranging from about 50% to about 90% by weight, a supporting resin in an amount ranging from about 8% to about 35% by weight, a wetting polymer in an amount ranging from 0% to about 16% by weight, and a dispersing polymer in an amount ranging from about 1% to about 15% by weight. The wetting polymer, when used, should be used in an amount ranging from 0.1% to about 16% by weight. Most preferably, the varnish includes a hydrophobic carrier in an amount ranging from about 60% to about 85% by weight, a supporting resin in an amount ranging from about 10% to about 25% by weight, a wetting polymer in an amount ranging from about 2% to about 10% by weight, and a dispersing polymer in an amount ranging from about 3% to about 8% by weight. Unless otherwise indicated, the percentages expressed herein are calculated based on the varnish alone, without addition of pigment particles.

To provide a hydrophobic phase for separating the pigment particles from the aqueous phase, the varnish should include a hydrophobic carrier, such as an oil. Any oil may be used, although oils that tend to completely repel water are preferred over those that tend to form an emulsion with water. Most preferred are vegetable oils, such as soya (soy)

and sunflower oil. Soya oil, for example, is non-drying, environmentally safe, and cheap. The most preferred oil for use with the present invention is linseed oil, or a mixture of linseed oil with soya or sunflower oil. When a mixture of oils is employed, linseed oil preferably is present in an amount of at least 50% by weight. Preferably, soy oil is present in an amount of 0% to about 75% by weight of the linseed oil; more preferably, from 0% to about 50% by weight.

The varnish includes a dispersing polymer, or solidifying polymeric system, for preventing reagglomeration of the pigment particles. The dispersing polymer comprises a polymeric agent or mixture of agents that adheres to and preferably encapsulates, at least in part, the pigment particle. The pigment particles thus are rendered hydrophobic, and will separate from an aqueous slurry. In addition, the pigment particles will remain well dispersed in the ink concentrate. Preferably, the dispersing polymer is a component that is solid at 25° C. but that will melt without degrading at an elevated temperature, such as a temperature of about 60° C. up to about 150° C. When the pigment is for use in an oil-based or hydrophobic vehicle, the dispersing polymer preferably will impart hydrophobicity and thixotropic properties to the pigment particles. The dispersing polymer further will aid in stabilizing the distribution of the pigment particles. A highly preferred range of dispersing polymer is from about 1% to about 12% by weight; even more preferred is a range of about 3% to about 8% by weight of the varnish.

Preferably, the dispersing polymer is a polyethylene, most preferably an oxidized polyethylene homopolymer. Other useful polymers include other polyolefins, which may also be modified to have surface active groups such as hydroxyl, carboxyl, amino, ammonium, or nitro groups, or the like. Most preferably, the polymer will have an acid value from about 0 to about 50. Useful polymers include those available from Allied Signal under the trademarks AC 316, 316A, 325, 330, 392, 395, 395A, 629, 629A, 655, 656, 680 and 6702, especially AC 656 and 6702.

It is believed that low molecular weight polymers are preferable in most instances. If the chain length of the polymer is too long, it is possible that the dispersing polymer will interact physically with more than one particle, thus causing undesired agglomeration of the particles. Accordingly, for example, the molecular weight may range from about 100 to about 50,000, usually up to about 20,000, typically up to about 10,000, and more typically up to about 5,000, at least when oxidized polyethylene is used as the dispersing polymer. The molecular weight used can vary, of course, depending upon the particular components used in the formulation.

The varnish further may include a supporting resin. This component comprises an agent that will wet the surface of the pigment particles and provide support for the pigment particles when they are released onto a printing substrate. Preferably, the resin has a melting point in the range of 130° C. to 180° C. The supporting resin preferably is included in an amount from about 8% to about 35% by weight of the varnish. A highly preferred range is from about 10% to about 25% by weight.

In accordance with the preferred embodiment of the present invention, the supporting resin includes a modified rosin ester, such as Pentrex 859HV from Hercules, Wilmington, Del., a phenolic modified rosin ester. Other suitable resins include high- or low-viscosity rosin-based resins, modified hydrocarbon resins, terpenic resins, and wood rosin resins. Examples include Pentrex 1100, from Hercules, Wilmington, Del., a phenol-modified rosin ester resin; Filtrez 693, from Akzo Coating, Inc., Baxley, Ga., a phenol-modified pentaerythritol rosin ester resin; Resinall 514, from Resinall Corp., Stamford, Conn., a hydrocarbon-modified rosin ester resin; Pentrex G, from Hercules, a maleic-modified pentaerythritol rosin ester; Piccolyte C115, from Hercules, a terpene hydrocarbon resin; Nirez 7002, from Arizona Chemical Company, Panama City, Fla., a phenol-modified terpene resin; and Hercolith 1003, from Hercules, a modified hydrocarbon resin.

The varnish preferably further includes a wetting polymer, or wetting polymeric system. In accordance with the present invention, the wetting polymer may include any polymeric agent or mixture of polymeric agents that assists in wetting the surface of the pigment particles to thereby prevent color quality from declining. When the pigment particle surface is wetted, there are no air gaps to dilute the color quality of the pigment. Acrylic resins, such as Acryloid-R DM-55 (which may to some extent be characterized as a supporting resin) from Rohm and Haas, Philadelphia, Pa., may be used in this regard, and are preferred. Other suitable polymers include Estane 5715, from B.F. Goodrich, Cleveland, Ohio., a polyurethane polymer, and Ure-Kyd #2, from Walsh Manufacturing Company, Newark, N.J., a urethane-modified linseed alkyd polymer. The wetting polymer preferably is present in an amount of about 10% to 40% by weight of the total of the wetting polymer and supporting resin.

Other useful wetting polymers include other polyolefins, acrylic polymers, polyesters and urethane polymers, and the like, as well as copolymers, and graft polymers of the aforementioned, all of which may also be modified to have surface active groups such as hydroxyl, carboxyl, carbonyl, amino, ammonium, or nitro groups, or the like. Poly acrylates and acetates are typical examples of polymers that may be used for such purposes.

Useful monomers and comonomers for polymerization include vinyl monomers, acrylic monomers, allylic monomers, acrylamide monomers, and mono- and dicarboxylic unsaturated acids. Vinyl esters include vinyl acetate, vinyl propionate, vinyl butyrates, vinyl benzoates, vinyl isopropyl acetates and similar vinyl esters. Vinyl aromatic hydrocarbons include styrene, methyl styrenes and similar lower alkyl styrenes, chlorostyrene, vinyl toluene, vinyl naphthalene, divinyl benzoate, and cyclohexene. Vinyl aliphatic hydrocarbon monomers include alpha olefins such as ethylene, propylene, isobutylene, and cyclohexene as well as conjugated dienes such as 1,3 butadiene, methyl-2-butadiene, 1,3-piperylene, 2,3 dimethyl butadiene, isoprene, cyclopentadiene, and dicyolopentadiene. Vinyl alkyl ethers include methyl vinyl ether, isopropyl vinyl ether, n-butyl vinyl ether, and isobutyl vinyl ether. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl and cresyl glycidyl ethers reacted with acrylic and methacrylic acids, hydroxyl alkyl acrylates and methacrylates such as hydroxyethyl and hydroxypropyl acrylates and methacrylates, as well as amino acrylates and methacrylates.

Polyester polymers and copolymers, comprising the esterification products of glycols, diols, or polyols with excess equivalents of dicarboxylic acid or polycarboxylic acids, also may be used. Linear aliphatic glycols are esterified with greater molar amounts of aromatic dicarboxylic acid and/or linear saturated dicarboxylic acid having between 2 and 36 linear carbon atoms such as adipic, azelaic, succinic, glutaric, pimelic, suberic or sebacic acid to produce low molecular weight polyesters. Such glycols further may be employed as wetting polymers.

Other ingredients may be included in the varnish. For example, an antioxidant may be included in an amount effective to provide an antioxidizing effect on the hydrophobic carrier. This amount preferably ranging from about 0.01% up to about 1% by weight. Examples of suitable antioxidants include tocopherol, hydroquinones, and butylated hydroxytoluene. BHT and hydroquinones may be dissolved in the hydrophobic carrier in an amount of about 5% to about 15% prior to mixing with the varnish.

The varnish may further include a softener in an amount of 0% to about 10%; preferably, about 0.1% to about 10%; more preferably, about 1% to about 5%. An example of a suitable softener is Capsule Softening Vehicle NVFG—380. The varnish further may include a plasticizer, such as a low molecular weight polymer, preferably a polyester. An example of such a plasticizer is Hercoflex 900, which may be used in an amount of 0% to about 10%, preferably, about 0.1% to about 10%, more preferably, about 1% to about 5%. Additional light oil diluents may be used, if desired.

To prepare the varnish, the necessary ingredients should be blended to form a mixture. Preferably, the oil is first placed into a container and heated to a temperature sufficient to melt the supporting resin. The resin then is added, followed by the remaining ingredients. If the ingredients are sensitive to air, they should be blended in an inert atmosphere. The varnish should remain in the inert atmosphere until ready to be blended with the aqueous slurry. If the ingredients do not have air sensitivity, the varnish may be prepared in ambient atmosphere.

PROCESS FOR PREPARING INK CONCENTRATE AND INK

In accordance with one embodiment of the present invention, the varnish is added to the aqueous slurry of pigment particles. The varnish should be added in a ratio of about 1:10 to about 10:1 by weight of the pigment particles; preferably, a ratio of about 3:7 to about 4:6 by weight of the pigment particles. Preferably, the mixture is stirred at a rapid rate after adding the varnish, at an elevated temperature. Although it is not intended for the present invention to be bound to a particular theory of operation, it is believed that the vigorous stirring and high temperature allow the varnish to bind more readily to the pigment particles.

The mixture should be vigorously stirred. Preferably, stirring is accomplished with a mechanical stirrer operated in the range of 500 RPM and 1000 RPM. Stirring of the varnish with the aqueous slurry should occur at an elevated temperature sufficient to enhance the binding of the dispersing polymer onto the pigment particles. Preferably, the elevated temperature ranges from about 40° C. to about 100° C.; more preferably, from about 65° C. to about 85° C.; most preferably, about 70° C. to about 80° C. The mixture should be stirred for at least about 30 minutes until discrete homogeneous organic and aqueous phases are evident. When the method of the present invention is applied to a presscake, the varnish is added directly to the presscake, and the mixture is stirred and heated, preferably at 60°–80° C., until water separates, and discrete organic and aqueous phases are evident. In either case, the aqueous phase, which comprises bulk slurry water, then should be removed, such as by decanting.

The remaining organic phase will comprise a blend of varnish, pigment particles (as modified), and water. The varnish carrier primarily will include hydrophobic carrier wetting polymer, and supporting resin. Because the pigment particles will not have had a chance to agglomerate, the size of these particles will remain small. The particle size typically will range from about 0.04 $\mu$m to about 0.5 $\mu$m, more typically, from about 0.04 $\mu$m to about 0.2 $\mu$m.

After the blend is formed, it preferably is dried by heating under a vacuum. The temperature should be elevated to a temperature sufficient to enhance the evaporation of water from the blend, but lower than the melt temperature of the dispersing polymer. In the case of oxidized polyethylene, the temperature should be from about 50° C. to about 70° C. Preferably, the blend is stirred while drying. The temperature should remain in the range of about 50° C. to about 70° C. until the evaporation of water is observed to cease.

After the evaporation of water ceases, the temperature should be further elevated to a temperature sufficient to melt the dispersing polymer. In the case of oxidized polyethylene having a molecular weight of about 500 to 20,000, the temperature will be from about 80° C. to about 110° C. At such elevated temperatures under a vacuum, any water remaining in the blend will evaporate. Moreover, because the dispersing polymer is melted, it will solidify on the surfaces of the pigment particles upon cooling of the blend with stirring. When the blend has cooled, an ink concentrate will be rendered.

In accordance with the preferred embodiment of the present invention, an organic solvent, preferably a volatile organic solvent, is used to separate salts and other impurities from the pigment particle slurry. The solvent is combined with the slurry, whereby an organic pigment-rich phase and an impurity-rich aqueous phase separate from the mixture. After the organic phase has separated, water may be added to the organic phase to again form an aqueous impurity-rich phase and an organic pigment-rich phase. This step may be repeated as many times as desired to thereby further purify the pigment.

The organic solvent may be any solvent that is capable of separating pigments from water and that has a relatively low boiling point, preferably in the range of about 100° C. to about 280° C. Suitable solvents include xylene and mixtures of xylenes, THFA (tetrahydrofurfuryl alcohol), cyclohexanone, lactate esters such as Purasolv ELS (an ethyl lactate ester available from PURAC America, Inc., Lincolnshire, Ill.), and glycol esters such as Dowanol DPM, PMA, PnB, TPnB, DnP, and DPnP from Dow Chemical Co., Midland, Mich. Mixtures of the foregoing may be used. The choice of a particular solvent will depend upon the pigment to be separated from aqueous solution. Pigments that are more hydrophobic may be separated from water with solvents that are relatively nonpolar, whereas pigments that are more hydrophilic will require solvents that are more polar.

After the impurities have been separated, the organic pigment-rich phase is blended with a varnish. The ratio of varnish to dry pigment in the pigment-rich phase should be in the ratio of about 10:1 to about 1:10, preferably, about 6:4 to about 7:3. The blend then is heated to a first temperature effective to drive off volatile components in the blend, including, for example, the volatile organic solvent. Any water that remains in the blend further will be driven off. This first temperature preferably ranges from about 30° C. to about 80° C., and preferably is lower than the melting temperature of the dispersing polymer.

After the volatile components in the blend have been driven off, the blend then is heated to a second temperature effective to melt the dispersing polymer, as hereinbefore discussed. The second temperature preferably is about 80° C. to about 120° C. Upon cooling, an ink concentrate will be rendered. Stirring during the cooling of the blend will assist in the solidification of the dispersing polymer evenly on the surfaces of the pigment particles.

When the method of the present invention is applied to dry pigment particles, the varnish preferably is heated to a temperature effective to melt the dispersing polymer. Pigment then is added, at a temperature ranging from about 80° C. to about 120° C., to form a blend of varnish and pigment particles. The temperature should be at least the melting point of the dispersing polymer, but should not be so high as to disrupt the stability of the pigment particles. The varnish:pigment ratio preferably ranges from about 10:1 to about 1:10, more preferably, from about 5:2 to about 1:1. After stirring, the blend is cooled to render an ink concentrate.

PREPARATION OF INK

To prepare an ink, the ink concentrate should be blended with a further ink vehicle. Any compatible ink vehicle may be used in conjunction with the ink concentrates of the present invention. The specific vehicle chosen will be a function of the desired end use of the ink to be prepared. For example, the vehicle may be a vehicle typically used for lithographic (direct and offset), letterpress, gravure, flexographic, silk-screen, or mimeograph printing processes, or vehicles used to form curable inks, such as infrared, ultraviolet and electron beam (E.B.) curable inks. Generally the pigments will be present in an amount from about 1 to about 90 percent, preferably from about 5 to about 40 percent, and most preferably from about 10 to about 20 percent, based on the total weight of the ink and based on a dry pigment. For example, the varnish: heat-set let-down varnish ratio may range from about 20:80 to about 70:30; preferably, about 25:75 to 40:60, depending on the type of pigment and varnish used. Any suitable ink vehicle, as known in the art, may be employed. Although the full advantage of the present ink formulations is achieved when the vehicle is substantially free of volatile organic components, the benefits will attain even if such volatile components are present. As used herein, the term "volatile organic component" is meant to indicate such solvents that are vapors at temperatures between about 100° C. and 280° C. In one embodiment, the ink vehicle will include one or more vegetable oils, as defined previously, especially a soya oil or a linseed oil. In another embodiment the ink vehicle will comprise naphthenic oil, as in combination with an unsaturated component, as discussed previously.

As is known in the art, a preferred heat set vehicle comprises a heat set gel vehicle, a heat set let-down vehicle, an anti-blocking agent, an anti-oxidant, and a rheological controlling agent. The mixture may be allowed to mix, as by using a SHOLD mixer, for a mixing time from about 5 minutes to about 1 hour, preferably from about 5 minutes to about 20 minutes. A heat set ink thus prepared will exhibit excellent transfer, very quick heat setting, rub resistance, and long run stability. Such inks further produce high quality prints, including prints having high gloss.

A preferred off set ink vehicle comprises an oil base, a modified rosin ester, an anti-blocking agent, a thixotropic agent and dryer. The ink may be prepared by mixing, as by using a SHOLD mixer, for a mixing time from about 5 minutes to about 30 minutes, preferably from about 5 minutes to about 10 minutes. An ink thus prepared will exhibit excellent transfer, very fast setting time, and long run stability, without emission of any hazardous solvent, and will produce high quality prints.

The following examples further illustrate the present invention but, of course, should not be construed as in any way limiting its scope.

EXAMPLE 1

This Example illustrates the preparation of a varnish for adding to an aqueous slurry of pigment particles.

The following ingredients were blended together in an argon atmosphere using a mixer, model Hidrobat-10 (Premier Mill Corp.) to form a homogeneous mixture.

| Example 1: Formulation of Varnish | |
| --- | --- |
| CHEMICALS | CONCENTRATION (wt %) |
| Aged linseed oil | 67.3 |
| Pentrex 859HV from Hercules | 20.4 |
| Acryloid-R DM-55 | 5.0 |
| AC 6702 Polymer from Allied Signal | 7.3 |

EXAMPLE 2

This Example illustrates the preparation of an ink concentrate according to the present invention.

Copper Phthalocyanine Blue, Lithol Rubine, and Diarylid Yellow AAA slurries each were mixed with the varnish prepared in Example 1 at 80° C. with vigorous stirring. The varnish was added to the pigment slurry in the following ratios:

| Example 2: Preparation of Ink Concentrate | |
| --- | --- |
| PIGMENT | PIGMENT VARNISH (weight/weight) |
| Copper Phthalocyanine Blue | 4/6 |
| Lithol Rubine | 3.6/6.4 |
| Diarylid Yellow AAA | 3.3/6.7 |

Water was decanted from each mixture.

The water content in each mixture was evaluated. Samples were valuated at various weight percentages of solids in the pigment slurry. The results were as follows:

| wt % of Solid in Slurry | Water Content (wt %) in Recovered Pigment |
| --- | --- |
| Example 2: Copper Phthalocyanine Blue | |
| 0.5 | 26 |
| 2 | 22 |
| 4 | 18 |
| 10 | 15 |
| 20 | 13 |
| 37.1 | 12 |
| Example 2: Lithol Rubine | |
| 0.5 | 25 |
| 2 | 18 |

-continued

| wt % of Solid in Slurry | Water Content (wt %) in Recovered Pigment |
|---|---|
| 4 | 30 |
| 10 | 50 |
| 21.6 | 25 |
| Example 2: Diarylid Yellow AAA | |
| 0.5 | 40 |
| 2 | 47 |
| 4 | 48 |
| 10 | 22 |
| 18 | 18 |

The water content was evaluated by drying the samples in an oven at 110° C. for 22 days.

Each blend of color, comprising 10 weight percent of solid pigment, was placed in a mixer, Model LDM-1QT (Charles Ross & Sons Co.), equipped with a heater and vacuum pump, and mixed at 50°–70° C. until water evaporation stopped. The temperature then was elevated to 90°–100° C. until the sample was dry. Upon cooling, an ink concentrate was rendered.

Pigment recovery from the 0.5% pigment slurry was 100% for the Copper Phthalocyanine Blue and Diarylid Yellow AAA pigments, but was slightly less than 100% for Lithol Rubine. It is believed that this is because Copper Phthalocyanine Blue and Diarylid Yellow AAA are more hydrophobic than Lithol Rubine. The low hydrophobicity of Lithol Rubine also is believed to cause the water content in the recovered Lithol Rubine slurry to vary without apparent correlation to the weight percent of solid in the slurry.

EXAMPLE 3

This Example demonstrates the properties of the ink concentrates prepared in Example 2, and comparatively evaluates the properties of the ink concentrates prepared in Example 2 against commercially available control compositions.

Controls were chosen from commercially available pigment flushes. The controls included Copper Phthalocyanine Blue Flush from Daicolor-Pope, Inc. (3H-209, Seikaset Blue); Lithol Rubine from Hilton-Davis (105C28H301, Heat-set Lithol Rubine), and Diarylid Yellow AAA from Magruder Color Co. (YA6454-HS, Diary Yellow AAA T/P Heat Set Flush). A bleach test analysis and particle size analysis were performed for each test sample and control.

The bleach test was performed by diluting the samples in a white ink from A.B. Dick Co. (3-5910 White Oil Base Offset Ink). The mixed inks were deposited onto drawn down paper available from the Leneta Company (Form 3NT-2, Ink Test Sheets, Translucent Bond). The samples were qualitatively evaluated for color strength. Initially, the samples were mixed at a mixing ratio of 1:99 (sample:ink) by weight. If the test samples were stronger than the control sample, the amount of test samples were reduced. Color strength was calculated according to the following formula:

Color strength=((Amount control/Amount test sample)−1)×100%.

The results were as follows:

| Example 3: Color strength of Test Sample vs. Control | |
|---|---|
| INK CONCENTRATE | COLOR STRENGTH (%) |
| Copper Phthalocyanine Blue | +40 |
| Lithol Rubine | +25 |
| Diarylid Yellow AAA | 0 |

The color strength indicates the amount of pigment that may be reduced in order to match the color of the control. For example, in the case of copper pthalocyanine blue, the amount of pigment in the test sample can be reduced 40% to make a sample having the same color strength as the control.

These results show that the color strength of the ink concentrates of the present invention is superior or equal to the color strength of the controls, in that as much or more control test sample was needed to provide a visually equivalent mark.

The particle size test was conducted by dispersing a Copper Phthalocyanine Blue test sample and a control in toluene (1–3 mg sample/10 ml toluene). The mixture was sonicated for one minute, and observed by SEM.

The test sample appeared well dispersed and non-agglomerated. In contrast, the control sample was not well dispersed, and was highly agglomerated. In addition, the particle size was narrowly distributed for the test sample, but was widely distributed for the control.

EXAMPLE 4

This Example demonstrates the preparation of a heat-set ink in accordance with the present invention, and further comparatively evaluates the heat-set ink against comparable inks prepared with commercially available compositions.

The ink concentrates made from the 10 weight percent solid slurries of Example 2 and controls of Example 3 each were mixed with a heat-set varnish having the following composition:

| Example 4 Heat-set Varnish | |
|---|---|
| MATERIAL | WEIGHT PERCENT |
| Thermalux HS 2000G* | 77.6 |
| Thermalux 500RF* | 5.2 |
| Nukyd #3* | 1.7 |
| Nukyd #7* | 3.5 |
| SA-2022 from Lawter International Inc. | 1.7 |
| COVI-OX T-70 from Henkel Corp. | 1.7 |
| WOH 6040-52* | 8.6 |

*Walsh Manufacturing Company

The sample:heat-set varnish ratio was 42:58 by weight. Each ink was mulled 200 revolutions at 10 lb. pressure with a Hoover Automatic Muller Model M5. The inks thus formed were suitable for a heat-set printing system. Five runs of each sample were prepared.

An offset swatching press from Little Joe Swatcher Inc. was used to print the inks onto sheets of coated stock paper. The printed inks were set at 121° C. by using a heater from SQG Industries.

The L*, a*, and b* values were measured for each ink, as were the gloss at 60° and density. Color quality was measured with a spectrophotometer, model 45/0 Color Quest (Hunter Lab). Gloss at 60° was evaluated with a Pro Gloss gloss meter (Hunter Lab). Density was measured with a densitometer, Model RD918 (Macbeth). The data obtained from the five samples, on average, was as follows:

Example 4: Copper Phthalocyanine Blue
Present Invention vs. Control

| Color Factors | Ink Concentrate | Ink Concentrate* | Control |
| --- | --- | --- | --- |
| L | 36.32 | 35.04 | 34.18 |
| a | −18.07 | −17.03 | −16.81 |
| b | −54.14 | −53.32 | −51.73 |
| Gloss at 60 degree | 55.8 | 55.4 | 51.3 |
| Density | 2.38 | 2.37 | 2.40 |

Example 4: Lithol Rubine
Present Invention vs. Control

| Color Factors | Ink Concentrate | Control |
| --- | --- | --- |
| L | 32.10 | 33.04 |
| a | 66.24 | 66.50 |
| b | 11.17 | 9.21 |
| Gloss at 60 degree | 64.7 | 60.3 |
| Density | 2.47 | 2.24 |

Example 4: Diarylid Yellow AAA
Present Invention vs. Control

| Color Factors | Ink Concentrate | Control |
| --- | --- | --- |
| L | 79.94 | 79.56 |
| a | 4.16 | 4.77 |
| b | 51.39 | 51.45 |
| Gloss at 60 degree | 68.1 | 65.5 |
| Density | 1.98 | 2.20 |

*Without mulling process

It is seen that the blue ink of the present invention is superior to the control inks, and that the red and yellow inks of the present invention are comparable to the control inks. Further, it is seen that the mulling process did not significantly affect the quality of the ink concentrate.

EXAMPLE 5

This example demonstrates that the method of the present invention provides pigment particles attached to the dispersing polymer by physical attraction.

The varnish was removed from the ink concentrate to isolate pigment particles. The blue ink concentrate made from the 10 percent solid slurry of Example 2 was dispersed in toluene and the pigment was recovered by centrifugation. $^1$H NMR (400 MHz) was used to evaluate the samples. The chemical shift of protons in the oxidized polyethylene is at 1.28013 ppm. The pigment showed a chemical shift at 1.27666 ppm. When the pigment sample was spiked with oxidized polyethylene, a chemical shift at 1.27784 ppm was observed. The chemical shift of the protons in oxidized polyethylene and those observed with the washed ink concentrate demonstrate that the oxidized polyethylene was identified in the ink concentrate as attached to the particle by the physical attraction. This provides strong evidence of the encapsulation of pigment particles by the solidification of the oxidized polyethylene.

EXAMPLE 6

This Example illustrates the removal of impurities from an aqueous pigment slurry.

An aqueous slurry of Lithol Rubine 57:1, containing about 2 weight percent pigment, was provided. About 2 grams of a volatile organic solvent was mixed with about 10 grams of slurry. Water separation was observed for each solvent tested.

Example 6
Solvent Evaluation

| SOLVENT | EVALUATION |
| --- | --- |
| Xylenes | Slow |
| THFA | Slow |
| 1-Hexanol | Emulsion (no separation) |
| Cyclohexanone | Quick |
| Purasolv ELS | Slow |
| Cyclohexanol | Quick |
| Dowanol DPM | Slow |
| Dowanol PMA | Slow |
| Dowanol PnB | Quick |
| Dowanol TPnB | Quick |
| Dowanol DnP | Slow |
| Dowanol DPnP | Slow |
| Ethanol | Very Slow |
| Methyl ethyl ketone | Very Slow |

Similar results were obtained using Diarylid Yellow AAA 12 slurry prepared by redissolving a presscake (Magruder Color Co., YA1933-PC). When copper phthalocyanine blue 15:3 and carbon black slurries were evaluated, xylenes were the preferred solvent.

EXAMPLE 7

This Example illustrates the benefits of repeating the solvent washing steps.

Two Lithol Rubine 57:1 slurries and a copper phthalocyanine slurry were washed with a solvent to provide a pigment-rich organic phase. For each slurry, three kilograms were mixed in a steel container for ten minutes at room temperature. Cyclohexanone (600 g) was added, and the phases separated. The supernatant was decanted, and about 1500 g water was added to the pigment-rich organic phase.

A portion of the supernatant was saved and evaluated for conductivity with a conductivity meter from JENCO electronics Ltd., Model 1671. This process then was repeated a number of times, until the conductivity reached about 200 μS/cm. In addition, the ethylene glycol content of the supernatant was evaluated using a gas chromatograph from Hewlett Packard, Model 5890. Ethylene glycol content was evaluated by comparing the washed pigment-rich organic phase with an ethylene glycol-acetone mixture (peak retention 3.3 min.).

Example 7
Lithol Rubine
(Cookson Matthey Eagle, Fort Lauderdale, Florida)

| Number of Washings | Conductivity |
| --- | --- |
| 1 | 19.25 mS/cm |
| 2 | 792 microS/cm |
| 3 | 131 microS/cm |
| 4 | 236 microS/cm |
| 5 | 160 microS/cm |
| Water for washing | 110 microS/cm |

The pigment began to redisperse into the wash water after wash 4. A small amount of cyclohexanone was added to offset this.

| Example 7 Lithol Rubine 7133-L-7352 (Magruder Color Co.) | |
| --- | --- |
| Number of Washings | Conductivity |
| 1 | 15.23 mS/cm |
| 2 | 1.63 mS/cm |
| 3 | 535 microS/cm |
| 4 | 306 microS/cm |
| 5 | 258 microS/cm |
| 6 | 208 micros/cm |
| Water for washing | 174 microS/cm |

Cyclohexanone was added periodically to prevent redispersion of the pigment particles.

| Example 7 Copper Phthalocyanine Blue | |
| --- | --- |
| Number of Washings | Conductivity |
| 1 | 195.0 mS/cm |
| 2 | 122.7 mS/cm |
| 3 | 60.2 mS/cm |
| 4 | 19.5 mS/cm |
| 5 | 15.4 mS/cm |
| 6 | 1.6 mS/cm |
| 7 | 446 microS/cm |
| 8 | 314 microS/cm |
| 9 | 397 micros/cm |
| 10 | 270 microS/cm |
| Water for washing | 170 microS/cm |

Wash water was added in a range of 750 g to 1000 g, with stirring for approximately 30 minutes. Pigments began to redisperse into the wash water after step 9. Xylenes were added to offset the dispersion of pigments.

The ethylene glycol content of the supernatant after step 10 was evaluated. No detectable level of ethylene lycol remained in the slurry.

The foregoing data illustrates that salts and other purities were effectively removed by the volatile organic solvents.

EXAMPLE 8

This Example illustrates the preparation of an ink concentrate from a purified pigment slurry.

The solvent-treated pigments prepared after the final washing steps of Example 7 were loaded into a mixture from Charles Ross & Son Co., Model LDM-1QT, equipped with a heater and vacuum pump. The varnish of Example 1 was introduced to the mixture at a pigment:varnish ratio of 36:64 by weight (calculated per the dry weight of the pigment). Pigment dry weight was evaluated by oven-drying a small (ca. 1.5 g) sample of the solvent-treated pigment at 100° C. for 18–24 hours.

The varnish and pigment dispersion were mixed for about ten minutes at room temperature and pressure. The mixture then was heated to 40° C. under vacuum at a mixing speed of about 70 rpm. When volatiles had been driven off, as evaluated by a pressure gauge, the temperature was increased to 100° C. for about ten minutes to melt the dispersing polymer. After cooling, 5 g of an antioxidant comprising 10% BHT in aged linseed oil was added.

EXAMPLE 9

This example illustrates the preparation of inks.

Color quality of each ink concentrate of Example 8 was evaluated and compared to an ink concentrate made from an unwashed slurry purchased from Cookson Matthey Eagle and to a color flush from Magruder Color Co. (LR-7300). The color quality was determined by preparing a heat-set ink from each ink concentrate by blending the heat-set let-down varnish of Example 4 at a 42:58 ratio with the ink concentrate.

| Example 9 Lithol Rubine 57:1 (Cookson Matthey Eagle) | | |
| --- | --- | --- |
| Color Factor | Solvent Treated | Not Solvent Treated |
| L | 27.97 | 31.43 |
| a | 57.84 | 63.90 |
| b | 17.06 | 13.59 |
| Gloss at 60 degree | 81.4 | 74.5 |
| Density | 2.19 | 2.19 |

The ink prepared using the solvent-treated pigment had a deeper red color and higher gloss than that prepared with the unwashed slurry.

| Example 9 Lithol Rubine 57:1 (Magruder Color Co.) | | |
| --- | --- | --- |
| Color Factor | Solvent Treated | Flush LR-7300 (Control) |
| L | 29.27 | 31.16 |
| a | 61.57 | 63.60 |
| b | 14.04 | 11.98 |
| Gloss at 60 degrees | 65.2 | 62.3 |
| Density | 2.44 | 2.33 |
| Bleach Test | 20% stronger | |

The ink concentrate of the invention had superior color and gloss over the commercially available flush. The color strength also was greater for the ink concentrate of the invention.

EXAMPLE 10

This Example illustrates the preparation of an ink concentrate and an ink from a dry pigment.

The following varnishes were prepared.

| Example 10 Varnish for Lithol Rubine | |
| --- | --- |
| Ingredients | Weight % |
| (Portion I) | |
| Aged linseed oil | 17.2 |
| Soy oil | 38.3 |
| Pentrex 1100 | 12.5 |
| Acryloid-R DM-55 | 3.1 |
| AC 656 Oxidized Polyethylene | 3.1 |
| Capsule Softening Vehicle NVFG-380 | 3.1 |
| (Portion II) | |
| Aged linseed oil | 21.1 |
| BHT | 1.6 |
| Total | 100.0 |

Portion II was added to the ink concentrate after the solidification process was completed.

Example 10
Varnish for Copper Phthalocyanine Blue

| Ingredients | Weight % |
|---|---|
| Hydrophobic carrier | 61.7 |
| Supporting resin | 21.3 |
| Wetting polymer | 5.3 |
| Dispersing polymer | 6.7 |
| Additional material(s) | 3.3 |
| Antioxidant | 1.7 |
| Total | 100.0 |

Several ingredients were evaluated for the blue varnish.

Example 10
Varnish for Diarylid Yellow

| Ingredients | Weight % |
|---|---|
| Aged linseed oil | 68.5 |
| Pentrex 1100 | 14.4 |
| Acryloid-R DM-55 | 3.6 |
| AC 656 Oxidized Polyethylene | 6.0 |
| Capsule Softening Vehicle NVFG-380 | 6.0 |
| COVI-OX T-70 | 1.5 |
| Total | 100.0 |

Example 10
Varnish for Carbon Black

| Ingredients | Weight % |
|---|---|
| Aged linseed oil | 33.3 |
| Soy oil | 33.3 |
| Pentrex 1100 | 21.3 |
| Acryloid-R DM-55 | 5.4 |
| AC 656 Oxidized Polyethylene | 6.7 |
| Total | 100.0 |

Each varnish was prepared by heating the oil on a hot plate equipped with a Yamato stirrer (model LR-41B-LABO-STIRRER) to a temperature of 160°. The supporting resin then was dissolved in the oil. After the resin dissolved in the oil, the temperature was reduced to 120° C. and the remaining ingredients were added. Pigment then was added at a temperature of 100° C. in the case of Lithol Rubine; at a temperature of 80° C. in the case of diarylid yellow; at a temperature of 100° C. for the copper phthalocyanine blue varnishes; and at a temperature of 120° C. in the case of carbon black. The mixture then was cooled. An antioxidant or its mixture with hydrophobic carrier was added in the ink concentrate with mixing.

Heat set inks were prepared in the manner of the preceding Examples. Lithol rubine was prepared in two portions to prevent the BHT from attaching to the surface of the pigment particles.

EXAMPLE 11

This Example comparatively evaluates several supporting resins useful in preparing ink concentrates.

Ink concentrates and heat set inks were prepared including the following supporting resins. The varnish for the ink concentrates was prepared according to the following formula:

Example 11
Ink Concentrates

| Ingredients | Weight Percent |
|---|---|
| Aged Linseed Oil | 40 |
| Supporting Resin | 12.8 |
| Acryloid-R DM-55 | 3.2 |
| AC 656 Oxidized Polyethylene | 4 |
| Copper phthalocyanine blue 15:3 | 40 |
| Total | 100 |

The supporting resins evaluated were the following:

Example 11
Supporting Resins

| Resin | Classification | Acid # | Melting Point °C. |
|---|---|---|---|
| Pentrex 859HV | Phenol modified ester of rosin | 17 | 140 |
| Pentrex 1100 | Phenol modified ester of rosin | 21 | 160 |
| Filtrez 693 | Phenol modified pentaerythritol ester of rosin | 20 | 170–175 |
| Resinall 514 | Hydrocarbon modified ester of rosin | ≦25 | 120–130 |
| Pentrex G | Maleic modified pentaerythritol ester of rosin | 14 | 127 |
| Piccolite C115 | Terpene hydrocarbon resin | — | 115 |
| Nirez 7002 | Phenol modified terpene resin | — | 140–150 |
| Hercolith 1003 | Modified hydrocarbon resin | 11 | 137 |

Inks were prepared according to the previous Examples. These inks were evaluated against the following controls:

| Lithol Rubine | Heat-Set Lithol Rubine (105C28H301) (Hilton-Davis) |
| Copper Phthalocyanine Blue | 3H-2091 Seikaset Blue (Daicolor-Pope) |
| Diarylid Yellow | YA6454-HS AAA T/P Heat set flush (Magruder Color Co.) |
| Carbon Black | HB-5912 Heatset Black (ACRO, Fenville, Michigan) |

The color properties of the inks thus prepared and controls were as follows:

Example 11
Color Properties of Inks of the Invention

| Resin | L | a | b | Gloss at 60 degree | Density |
|---|---|---|---|---|---|
| Pentrex 859HV | 37.08 | −17.41 | −54.81 | 50.2 | 2.23 |
| Pentrex 1100 | 35.54 | −16.56 | −55.66 | 58.0 | 2.39 |
| Filtrez 693 | 38.96 | −19.49 | −54.73 | 42.6 | 2.12 |
| Resinall 514 | 39.71 | −19.78 | −53.71 | 44.3 | 2.04 |
| Pentrex G | 37.53 | −18.09 | −55.13 | 48.3 | 2.23 |
| Piccolyte | 37.00 | −17.80 | −55.33 | 52.3 | 2.20 |

Example 11
Color Properties of Inks of the Invention

| Resin | L | a | b | Gloss at 60 degree | Density |
|---|---|---|---|---|---|
| C115 | | | | | |
| Nirez 7002 | 37.48 | −18.36 | −54.71 | 53.8 | 2.19 |
| Hercolith 1003 | 37.49 | −17.77 | −55.37 | 49.4 | 2.11 |

Example 11
Color Properties of Controls

| Pigment | Color | Pigment Content in Flush | L | a | b | Gloss at 60 degree | Density |
|---|---|---|---|---|---|---|---|
| Copper Phthalocyanine blue 15:3 | Blue | 40 wt % (est) | 34.18 | −16.81 | −51.73 | 51.3 | 2.41 |
| Lithol Rubine (Pigment Red 57:1) | Red | 36 wt % | 33.04 | 66.50 | 9.21 | 60.3 | 2.24 |
| Diarylid Yellow AAA (Pigment Yellow 12) | Yellow | 33 wt % (est) | 79.56 | 4.77 | 51.45 | 65.5 | 2.21 |
| Carbon Black | Black | 42 wt % (est) | 7.76 | −0.03 | −0.24 | 64.4 | 2.16 |

The blueness of the inks of the invention were superior to that of the blue control ink. In addition, Pentrex 1100, Piccolyte C115, and Nirez 7002 afforded inks with higher gloss than the control.

EXAMPLE 12

This Example quantitatively evaluates the effects of modifying the supporting resin content in the ink concentrates.

Ink concentrates having the following formulations were prepared.

Example 12
Ink Concentrates

| | |
|---|---|
| Copper Phthalocyanine Blue 15.3 | 40% |
| AC 656 Oxidized Polyethylene | 4% |
| Pentrex 1100 | Total 8%–19.8% |
| Acryloid-R DM-55 | Ratio 4:1 (Pentrex:Acryloid) |
| Aged linseed oil | Balance |

Inks prepared with these ink concentrates had the following color properties.

Example 12
Color Properties of Inks

| Content of resin + wetting polymer (wt %) | L | a | b | Gloss at 60 degree | Density |
|---|---|---|---|---|---|
| 19.8 | 36.14 | −16.87 | −54.83 | 53.0 | 2.24 |
| 16 | 35.54 | −16.56 | −55.66 | 58.0 | 2.39 |
| 12 | 35.07 | −16.10 | −55.58 | 58.7 | 2.37 |

Example 12
Color Properties of Inks

| Content of resin + wetting polymer (wt %) | L | a | b | Gloss at 60 degree | Density |
|---|---|---|---|---|---|
| 8 | 34.44 | −16.28 | −53.31 | 46.6 | 2.26 |

It is thus seen that blueness and gloss were maximized between about 12% and about 16% of total resin and wetting polymer. All samples, however, had higher blueness than the control of Example 11, and many samples also had a higher gloss.

EXAMPLE 13

This Example comparatively evaluates three wetting polymers.

Ink concentrates were prepared with Acryloid-R DM-55, Estane 5715 (BF Goodrich) and Ure-Kyd #2 (Walsh Manufacturing Co.). The color properties of inks prepared with these ink concentrates were as follows:

Example 13
Color Properties of Inks

| Wetting Polymer | L | a | b | Gloss at 60 degree | Density |
|---|---|---|---|---|---|
| Acryloid-R DM-55 | 35.54 | −16.56 | −55.66 | 58.0 | 2.39 |

Example 13
Color Properties of Inks

| Wetting Polymer | L | a | b | Gloss at 60 degree | Density |
|---|---|---|---|---|---|
| Estane 5715 | 37.55 | −18.06 | −54.93 | 51.4 | 2.23 |
| Ure-Kyd #2 | 37.37 | −18.02 | −55.17 | 53.1 | 2.28 |

Acryloid-R DM-55 was the best of the resins evaluated, although all resins were superior to the control.

EXAMPLE 14

This Example evaluates the wetting polymer:supporting resin ratio.

Ink concentrates of the following general formula were prepared:

Example 14
Ink Concentrates

| | |
|---|---|
| Copper Phthalocyanine Blue 15:3 | 40% |
| AC 656 Oxidized Polyethylene | 4% |
| Pentrex 1100 | 0%–16% |
| Acryloid-R DM-55 | 16%–0% |
| Aged linseed oil | 40% |

The color properties of inks prepared with these ink concentrates were as follows.

Example 14
Color Properties of Inks

| Weight % of wetting agent in mixture of resin and wetting agent | L | a | b | Gloss at 60 degree | Density |
|---|---|---|---|---|---|
| 0 | 34.33 | −15.79 | −54.19 | 49.6 | 2.38 |
| 10 | 36.38 | −17.50 | −54.52 | 47.7 | 2.33 |
| 20 | 35.54 | −16.56 | −55.66 | 58.0 | 2.39 |
| 40 | 35.73 | −16.90 | −54.44 | 47.0 | 2.29 |
| 100 | 35.21 | −16.39 | −54.38 | 46.6 | 2.29 |

All samples had excellent blueness, with both blueness and gloss maximized at a wetting polymer:resin ratio of about 1:4.

EXAMPLE 15

This Example comparatively evaluates several dispersing polymers for use in preparing ink concentrates.

Ink concentrates having the following general formula were prepared:

Example 15
Ink Concentrates

| | |
|---|---|
| Copper Phthalocyanine Blue 15:3 | 40% |
| Acryloid-R DM-55 | 3.2% |
| Pentrex 1100 | 12.8% |
| Dispersing polymer | 4% |
| Aged linseed oil | 40% |

The following dispersing polymers were evaluated.

Example 15
Dispersing Polymers

| Polymeric dispersing agent | Classification | Acid number | Melting point (degree C.) |
|---|---|---|---|
| AC 395 | High density oxidized polyethylene | 41 | 137 |
| AC 656 | Oxidized polyethylene | 15 | 98 |
| AC 655 | Oxidized polyethylene | 16 | 107 |
| AC 6702 | Oxidized polyethylene | 15 | 88 |
| AC 16 | Polyethylene | — | 102 |
| AC 617 | Polyethylene | — | 101 |
| AC 430 | Copolymer of ethylene-vinyl acetate | 26% vinyl acetate | 75 |
| AC 540 | Copolymer of Ethylene-acrylic acid | 40 | 105 |
| ACTER 1450 | Ethylene, acrylic acid and vinyl acetate terpolymer | 35 | 95 |

The following results were obtained.

Example 15
Color Properties of Inks

| Polymeric dispersing agent | L | a | b | Gloss at 60 degree | Density |
|---|---|---|---|---|---|
| AC 395 | 37.56 | −18.05 | −55.10 | 55.5 | 2.25 |
| AC 656 | 35.54 | −16.56 | −55.68 | 58.0 | 2.39 |
| AC 655 | 36.99 | −17.40 | −54.33 | 54.0 | 2.18 |
| AC 6702 | 36.92 | −17.30 | −54.89 | 51.6 | 2.14 |
| AC 16 | 35.97 | −16.73 | −54.86 | 51.8 | 2.14 |
| AC 617 | 37.27 | −17.92 | −54.71 | 51.8 | 2.14 |
| AC 430 | 35.33 | −16.86 | −53.75 | 52.5 | 2.12 |
| AC 540 | 40.14 | −20.26 | −54.36 | 50.9 | 2.14 |
| ACTER 1450 | 35.77 | −17.05 | −54.45 | 52.0 | 2.25 |

AC-656 was the most superior of the dispersing polymers, although all rendered superior or acceptable inks.

EXAMPLE 16

This Example evaluates the dispersing polymer content in the ink concentrates.

Ink concentrates of the following formulations were prepared:

Example 16
Ink Concentrates

| Ingredients | Weight Percent |
| --- | --- |
| Aged Linseed Oil | 35–43 |
| Pentrex 1100 | 12.8 |
| Acryloid-R DM-55 | 3.2 |
| AC 656 Oxidized polyethylene (Polymeric dispersing agent) | 0–8 |
| Copper phthalocyanine blue 15:3 | 40 |
| COVI-OX T-70* (Anti-oxidant) | 1 |
| Total | 100 |

*In this and subsequent examples, COVI-OX T-70 was added in the ink concentrate after the solidification of the dispersing polymer was completed on the pigments.

The color properties of inks prepared with these ink concentrates were as follows:

Example 16
Color Properties of Inks

| Weight % of AC 656 | L | a | b | Gloss at 60 degree | Density |
| --- | --- | --- | --- | --- | --- |
| 0 | 38.94 | −19.76 | −53.41 | 47.7 | 2.20 |
| 2 | 34.35 | −15.58 | −55.64 | 56.9 | 2.28 |
| 4 | 35.54 | −16.56 | −55.68 | 58.0 | 2.39 |
| 6 | 35.94 | −16.98 | −55.11 | 55.5 | 2.24 |
| 8 | 36.50 | −17.83 | −52.49 | 36.6 | 2.14 |

Without the dispersing polymer, the color quality and gloss of the ink concentrates were low. The optimum amount of dispersing polymer was determined to be about 4%, amounts greater than 6% detrimentally affecting gloss. This amount will depend on the surface area and other properties of the pigments employed.

EXAMPLE 17

This Example evaluates the oils used as hydrophobic carriers in preparing the ink concentrates.

Ink concentrates were prepared using aged linseed oil and soy oil. These ink concentrates had the following general formula:

Example 17
Ink Concentrates

| Ingredients | Weight Percent |
| --- | --- |
| Hydrophobic Carrier | 40 |
| Pentrex 1100 | 12.8 |
| Acryloid-R DM-55 | 3.2 |
| AC 656 Oxidized polyethylene | 4 |
| Copper phthalocyanine blue 15:3 | 40 |

The color properties of inks prepared with these ink concentrates were as follows:

Example 17
Color Properties of Inks

| Weight % of Soy Oil in hydrophobic carrier | L | a | b | Gloss at 60 degree | Density |
| --- | --- | --- | --- | --- | --- |
| 0 | 35.54 | −16.56 | −55.66 | 58.0 | 2.39 |
| 50 | 39.57 | −19.96 | −54.81 | 51.9 | 2.14 |
| 75 | 32.17 | −14.58 | −56.70 | 43.6 | 2.29 |
| 100 | 40.82 | −20.13 | −52.72 | 37.3 | 1.92 |

Gloss was drastically reduced after the soy oil increased above 50%.

EXAMPLE 18

This Example evaluates the use of additional materials in the ink concentrates.

Blue inks were prepared from ink concentrates having the following general formula:

Example 18
Ink Concentrates

| Ingredients | Weight Percent |
| --- | --- |
| Aged Linseed Oil | 35–39 |
| Pentrex 1100 | 9.6–12.8 |
| Acryloid-R DM-55 | 2.4–3.2 |
| AC 656 Oxidized Polyethylene | 4 |
| Additional Material | 2–4 |
| Copper Phthalocyanine Blue 15:3 | 40 |
| COVI-OX T-70 | 1 |
| Total | 100 |

The inks had the following color properties:

Example 18
Color Properties of Inks

| Name and wt % of additional material | Total weight % of resin and wetting agent | L | a | b | Gloss at 60 degrees | Density |
| --- | --- | --- | --- | --- | --- | --- |
| Estane 5715 (2%) | 14 | 35.43 | −16.61 | −54.35 | 51.8 | 2.16 |
| Hercolyn D (2%) | 16 | 34.91 | −16.47 | −54.55 | 54.4 | 2.39 |
| Hercoflex 900 (4%) | 16 | 39.54 | −20.42 | −53.88 | 50.9 | 2.21 |
| Ure-Kyd #2 (4%) | 16 | 38.58 | −18.81 | −55.15 | 52.4 | 2.25 |
| Capsule Softening Vehicle NVFG-380 (4%) | 12 | 38.95 | −20.01 | −53.69 | 52.8 | 2.23 |

Estane 5715 is a polyurethane, which was evaluated for its properties as a wetting polymer. Hercolyn D is a hydrogenerated methyl rosin ester, and was also evaluated as a wetting polymer. Ure-Kyd #2 is a urethane-modified linseed alkyd that acts as a wetting polymer and a rheological property modifier. Hercoflex 900 is a liquid ester that acts as a plasticizer and ink rheology reducer. Capsule softening vehicle NVFG-380 is a hydrocarbon modified ester of rosin that acts as a wetting polymer and also as an ink rheology reducer.

EXAMPLE 19

This Example evaluates the pigment content of the ink concentrates of the invention.

Ink concentrates were prepared in accordance with the following general formula:

Example 19
Ink Concentrate

| Ingredients | Weight Percent |
|---|---|
| Aged Linseed Oil | 39–49 |
| Pentrex 1100 | 12.8 |
| Acryloid-R DM-55 | 3.2 |
| AC 656 Oxidized Polyethylene | 4 |
| Copper Phthalocyanine Blue 15:3 | 30-40* |
| COVI-OX-T-70 | 1 |
| Total | 100 |

*Dry weight

Inks prepared with those ink concentrates had the following properties:

Example 19
Color Properties of Inks

| Weight % of pigment | L | a | b | Gloss at 60 degree | Density |
|---|---|---|---|---|---|
| 40 | 35.54 | −16.56 | −55.66 | 58.0 | 2.39 |
| 35 | 36.59 | −17.85 | −54.18 | 51.5 | 2.22 |
| 30 | 44.59 | −24.31 | −51.61 | 50.1 | 2.04 |

It was observed that, within this range, 40% was optimum, with a significant decrease in color properties below 35%.

EXAMPLE 20

This Example illustrates the preparation of red, yellow, and black ink concentrates.

Ink concentrates having the following formulas were prepared, and inks prepared therefrom. The color properties of each ink also are shown.

Example 20
Ink concentrate (Lithol Rubine)

| Ingredients | Weight Percent |
|---|---|
| Aged Linseed Oil | 11 |
| Soy Oil | 24.5 |
| Pentrex 1100 | 8 |
| Acryloid-R DM-55 | 2 |
| AC 656 Oxidized Polyethylene | 2 |
| Capsule Softening Vehicle NVFG-380 | 2 |
| Irgalite Rubine L4BE* | 36 |
| Butylated hydroxytoluene (BHT) from Universal Oil Product, Des Plaines, Illinois | 1 |
| Aged Linseed Oil** | 13.5 |
| Total | 100 |

*Lithol Rubine (Pigment Red 57:1) from CIBA-GEIGY Corp., Newport, Delaware
**The BHT was dissolved in the second portion of aged linseed oil Example 20
Color Properties of Lithol Rubine Ink

| Color Factor | Value |
|---|---|
| L | 32.15 |
| a | 70.60 |
| b | 8.98 |
| Gloss at 60 degree | 65.3 |
| Density | 2.17 |

Example 20
Ink Concentrate (Diarylid Yellow)

| Ingredients | Weight Percent |
|---|---|
| Aged Linseed Oil | 45.7 |
| Pentrex 1100 | 9.6 |
| Acryloid-R DM-55 | 2.4 |
| AC 656 Oxidized Polyethylene | 4 |
| Capsule softening Vehicle NVFG-380 | 4 |
| Irgalite Yellow LBIW* | 33.3 |
| COVI-OX T-70 | 1 |
| Total | 100 |

*Diarylid Yellow (Pigment Yellow 13) from CIBA-GEIGY Corp., Newport, DE

Example 20
Color Properties of Diarylid Yellow Ink

| Color Factor | Value |
|---|---|
| L | 78.75 |
| a | 4.06 |
| b | 50.79 |
| Gloss at 60 degree | 70.7 |
| Density | 2.08 |

Example 20
Ink Concentrate (Carbon Black)

| Ingredients | Weight Percent |
|---|---|
| Aged Linseed Oil | 20 |
| Soy Oil | 20 |
| Pentrex 1100 | 12.8 |
| Acryloid-R DM-55 | 3.2 |
| Ac 656 Oxidized Polyethylene | 4 |
| Regal 350 R*, Carbon Black | 40 |
| Total | 100 |

*Regal 350R is from Cabot Corp., Waltham, Massachusetts

Example 20
Color Properties of Carbon Black Ink

| Color Factor | Value |
|---|---|
| L | 8.87 |
| a | 0.21 |
| b | −0.20 |
| Gloss at 60 degree | 69.6 |
| Density | 2.10 |

The red ink concentrate was prepared as follows. First, the antioxidant was dissolved in aged linseed oil and set aside. All other ingredients of the varnish were blended together and heated to 160° C. The temperature then was lowered to 100° C., and pigment was added. The temperature was further lowered, and the antioxidant solution was added.

The yellow and black ink concentrates were prepared by (1) heating the oil to 160° C.; (2) adding the supporting resin; (3) cooling the mixture to 120° C. and adding the wetting polymer, dispersing polymer, and (for the yellow ink concentrate) the capsule softening vehicle; (4) for the yellow ink concentrate, cooling to 80° C.; (5) adding the pigment; and (6) for the yellow ink concentrate, adding the antioxidant after cooling to room temperature. The yellow varnish was cooled to prevent thermal degradation of the yellow pigment.

The color properties of the inks thus prepared were superior or equivalent to the controls of Example 11.

It is thus seen that the present invention has satisfied the foregoing general object. Ink concentrates and inks having superior color properties may be prepared. The ink concentrates may be prepared from slurries or dry pigments. In practicing the invention, the pigment particles prepared from slurries need not be milled. Dry pigment particles also may be incorporated into ink concentrates and inks having superior color properties.

While particular embodiments of the invention have been shown, it will be understood that the invention is not limited thereto since modifications may be made by those skilled in the art, particularly in light of the foregoing teachings. It is, therefore, contemplated by the invention to cover any such modifications as incorporate those features which constitute the essential features of these improvements within the true spirit and scope of the invention. All references cited herein are hereby incorporated by reference in their entireties.

What is claimed is:

1. A method for preparing an ink concentrate, comprising the steps of:
   providing a pigment in the form of a plurality of pigment particles;
   blending said pigment particles with a varnish to form a blend, said varnish including at least one dispersing polymer which remains as solid at 25° C. in the blend, to thereby form a blend including pigment particles and varnish;
   heating said blend to a temperature effective to melt said dispersing polymer; and
   cooling said blend to thereby cause said dispersing polymer to solidify on the surfaces of at least a portion of said pigment particle.

2. A method according to claim 1, wherein said varnish comprises a hydrophobic carrier, a supporting resin, a wetting polymer, and a dispersing polymer.

3. A method according to claim 2, wherein said hydrophobic carrier is an oil selected from the group consisting of soya oil, sunflower oil, linseed oil, and mixtures thereof.

4. A method according to claim 2, wherein said wetting polymer is an acrylic resin.

5. A method according to claim 2, wherein said supporting resin is a rosin-based ester.

6. A method according to claim 2, wherein said dispersing polymer is an oxidized polyethylene.

7. A method according to claim 2, wherein said hydrophobic carrier is present in an amount ranging from about 50% to about 90% by weight, wherein said supporting resin is present in an amount ranging from about 8% to about 35% by weight, wherein said wetting polymer is present in an amount ranging from about 0.1% to about 16% by weight, and wherein said dispersing polymer is present in an amount ranging from about 1% to about 15% by weight.

8. A method according to claim 7, wherein said varnish includes an antioxidant in an amount ranging from about 0.01% to about 1% by weight.

9. The ink concentrate prepared by the method of claim 1.

10. A method for preparing an ink, comprising the steps of:
    providing an ink concentrate according to claim 9;
    blending said ink concentrate with an ink vehicle to thereby form an ink.

11. The ink prepared by the method of claim 10.

12. An ink according to claim 11, wherein said ink is a heat set ink.

13. A method for preparing an ink concentrate, comprising the steps of:
    (a) providing an aqueous slurry of pigment particles;
    (b) adding a varnish to the aqueous slurry, the varnish including at least one dispersing polymer, to thereby form a mixture of varnish and slurry;
    (c) removing water from the mixture to leave a blend of varnish and pigment;
    (d) heating the blend to a temperature effective to melt the dispersing polymer and to drive off any remaining water in the blend; and
    (e) cooling the blend to thereby form an ink concentrate.

14. A method according to claim 13, further comprising the step of heating the blend of pigment and varnish to a temperature sufficient to enhance the binding of the dispersing polymer onto the pigment particles prior to step (d).

15. A method according to claim 14, wherein said temperature ranges from about 40° C. to about 100° C.

16. A method according to claim 13, wherein said varnish comprises a hydrophobic carrier, a supporting resin, a wetting polymer, and a dispersing polymer.

17. A method according to claim 16, wherein said hydrophobic carrier is an oil selected from the group consisting of soya oil, sunflower oil, linseed oil, and mixtures thereof.

18. A method according to claim 16, wherein said wetting polymer is an acrylic resin.

19. A method according to claim 16, wherein said supporting resin is a rosin-based ester.

20. A method according to claim 16, wherein said dispersing polymer is an oxidized polyethylene.

21. A method according to claim 16, wherein said hydrophobic carrier is present in an amount ranging from about 50% to about 90% by weight, wherein said supporting resin is present in an amount ranging from about 8% to about 35% by weight, wherein said wetting polymer is present in an amount ranging from about 0.1% to about 16% by weight, and wherein said dispersing polymer is present in an amount ranging from about 1% to about 15% by weight.

22. A method according to claim 21, wherein said varnish includes an antioxidant in an amount ranging from about 0.01% to about 1% by weight.

23. The ink concentrate prepared by the method of claim 13.

24. A method for preparing an ink, comprising the steps of:
    providing an ink concentrate according to claim 23;
    blending said ink concentrate with an ink vehicle to thereby form an ink.

25. The ink prepared by the method of claim 24.

26. An ink according to claim 25, wherein said ink is a heat set ink.

27. A method for preparing an ink concentrate, comprising the steps of:
    (i) providing an aqueous slurry of pigment particles;

(ii) treating the slurry with an organic solvent to thereby form an aqueous impurity-rich phase and an organic pigment-rich phase;

(iii) separating the organic pigment-rich phase;

(iv) optionally adding water to the organic pigment-rich phase and repeating step (iii);

(v) adding a varnish to the separated organic pigment-rich phase, the varnish including at least one dispersing polymer, to thereby form a blend of varnish, organic solvent, and pigment;

(vi) heating the blend to a temperature effective to melt the dispersing polymer and to drive off volatile components of the mixture; and (vii) cooling the blend to thereby form an ink concentrate.

28. A method according to claim 27, wherein said step (iv) is repeated at least one time.

29. A method according to claim 27, wherein said varnish comprises a hydrophobic carrier, a supporting resin, a wetting polymer, and a dispersing polymer.

30. A method according to claim 29, wherein said hydrophobic carrier is an oil selected from the group consisting of soya oil, sunflower oil, linseed oil, and mixtures thereof.

31. A method according to claim 29, wherein said wetting polymer is an acrylic resin.

32. A method according to claim 29, wherein said supporting resin is a rosin-based ester.

33. A method according to claim 29, wherein said dispersing polymer is an oxidized polyethylene.

34. A method according to claim 29, wherein said hydrophobic carrier is present in an amount ranging from about 50% to about 90% by weight, wherein said supporting resin is present in an amount ranging from about 8% to about 35% by weight, wherein said wetting polymer is present in an amount ranging from about 0.1% to about 16% by weight, and wherein said dispersing polymer is present in an amount ranging from about 1% to about 15% by weight.

35. A method according to claim 34, wherein said varnish includes an antioxidant in an amount ranging from about 0.01% to about 1% by weight.

36. The ink concentrate prepared by the method of claim 30.

37. A method for preparing an ink, comprising the steps of:

providing an ink concentrate according to claim 36;

blending said ink concentrate with an ink vehicle to thereby form an ink.

38. The ink prepared by the method of claim 37.

39. An ink according to claim 38, wherein said ink is a heat set ink.

40. A method for preparing an ink concentrate, comprising the steps of:

(1) providing dry pigment particles;

(2) providing a varnish, the varnish including at least one dispersing polymer;

(3) blending said varnish and said pigment particles to thereby form a blend of varnish and pigment particles, wherein the dispersing polymer remains as solid at 25° C. in the blend;

(4) heating said blend to a temperature effective to melt said dispersing polymer; and (5) cooling said blend to thereby form an ink concentrate.

41. A method according to claim 40, wherein said varnish is heated to said temperature prior to blending said varnish with said pigment particles.

42. A method according to claim 40, wherein said varnish comprises a hydrophobic carrier, a supporting resin, a wetting polymer, and a dispersing polymer.

43. A method according to claim 42, wherein said hydrophobic carrier is an oil selected from the group consisting of soya oil, sunflower oil, linseed oil, and mixtures thereof.

44. A method according to claim 42, wherein said wetting polymer is an acrylic resin.

45. A method according to claim 42, wherein said supporting resin is a rosin-based ester.

46. A method according to claim 42, wherein said dispersing polymer is an oxidized polyethylene.

47. A method according to claim 42, wherein said hydrophobic carrier is present in an amount ranging from about 50% to about 90% by weight, wherein said supporting resin is present in an amount ranging from about 8% to about 35% by weight, wherein said wetting polymer is present in an amount ranging from about 0.1% to about 16% by weight, and wherein said dispersing polymer is present in an amount ranging from about 1% to about 15% by weight.

48. A method according to claim 47, wherein said varnish includes an antioxidant in an amount ranging from about 0.01% to about 1% by weight.

49. The ink concentrate prepared by the method of claim 40.

50. A method for preparing an ink, comprising the steps of:

providing an ink concentrate according to claim 49;

blending said ink concentrate with an ink vehicle to thereby form an ink.

51. The ink prepared by the method of claim 50.

52. An ink according to claim 51, wherein said ink is a heat set ink.

* * * * *